Nov. 1, 1932.    A. A. WARNER    1,885,646
UNIVERSAL JOINT
Filed March 23, 1931
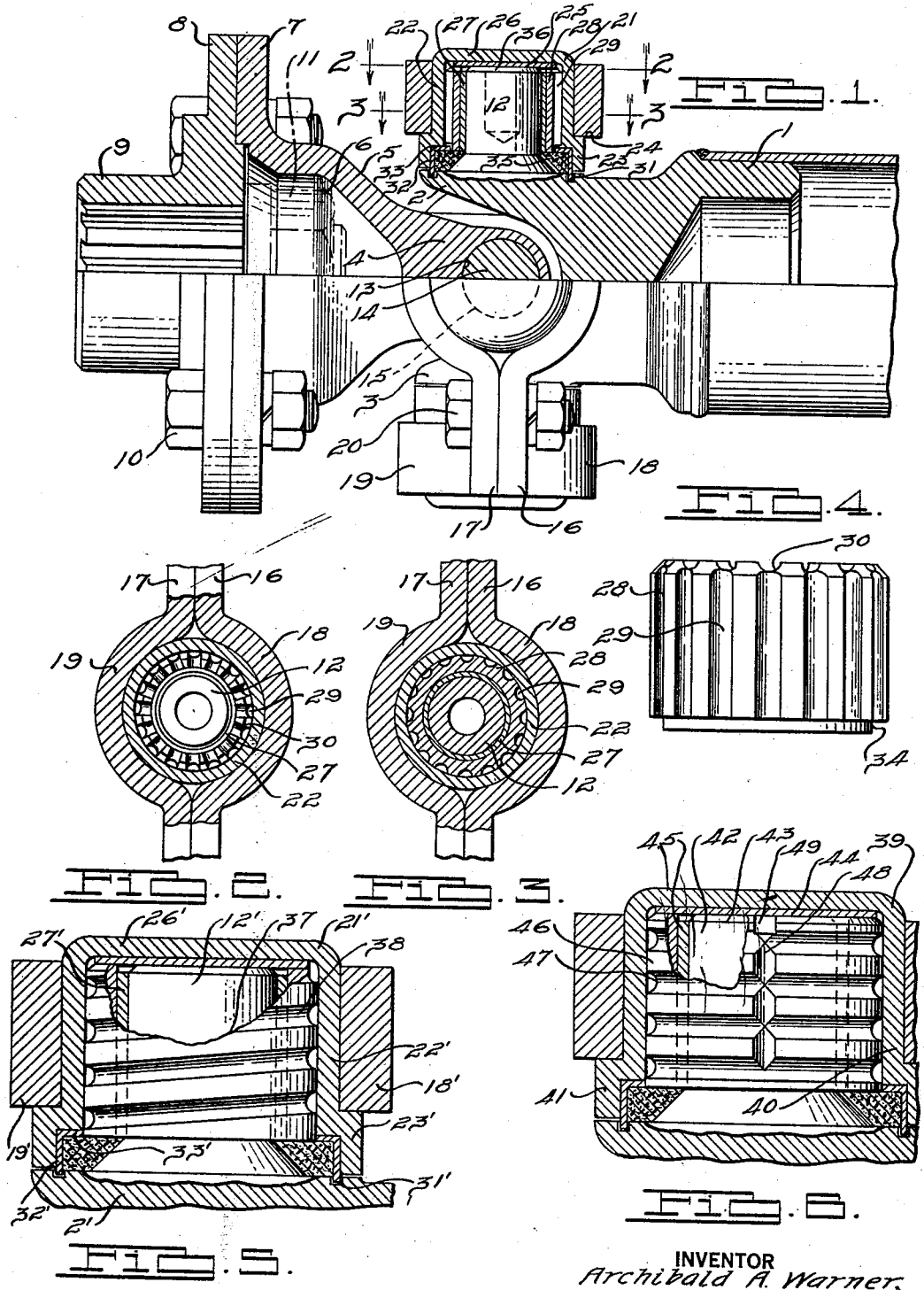
INVENTOR
Archibald A. Warner.
BY
Harness, Dickey, Pierce & Hann
ATTORNEYS.

Patented Nov. 1, 1932

1,885,646

UNITED STATES PATENT OFFICE

ARCHIBALD A. WARNER, OF ROYAL OAK, MICHIGAN

UNIVERSAL JOINT

Application filed March 23, 1931. Serial No. 524,447.

This invention relates to improved means for lubricating bearings of a universal joint of the type shown in my co-pending applications, Serial Nos. 524,445 and 524,446, filed on March 23, 1932.

The main objects of this invention are to provide improved bearings between the trunnions of the driving and driven members of a universal joint, and the torque ring by which they are connected together; to provide means of this kind which are adapted to retain a substantially large supply of lubricant; to provide a separable member having lubricant containing chambers that communicate with the inner end of the bearings and which may be filled with lubricant prior to assembly of the bearings; and to provide a casing which completely encloses the lubricant containing member.

An illustrative embodiment of the invention is shown in the accompanying drawing, in which—

Fig. 1 is a view in side elevation showing a universal joint which embodies my invention, partly in section.

Fig. 2 is a transverse horizontal sectional view taken on the line 2—2 of Fig. 1.

Fig. 3 is a transverse horizontal sectional view taken on the line 3—3 of Fig. 1.

Fig. 4 is an enlarged perspective view showing a lubricant retaining element of my improved universal joint bearing in detail.

Fig. 5 is a fragmentary sectional view of a universal joint showing a trunnion which is provided with a bearing that embodies another form of the invention.

Fig. 6 is a view similar to Fig. 5 but showing a trunnion on which is journaled a bearing that embodies a further development of the invention.

In the forms shown in Figs. 1 to 4, inclusive, of the drawing, the invention is illustrated in conjunction with a universal joint which includes a rotatable yoke-shaped torque transmitting member 1 having diverging arms 2 and 3 between which is receivable an end portion 4 of a rotatable torque transmitting element 5.

The outer end portion of the element 5 is cylindrical in shape and it is provided with a central recess 6 and an outwardly extending radial flange 7 by which it may be conveniently secured to a flange 8 of a splined collar 9, by bolts 10. The splined collar is adapted to receive an end portion of a drive shaft (not shown) to which it may be rigidly attached by a nut 11 that is housed in the recess 6.

Integrally formed on the arms 2 and 3 of the yoke of the member 1 are trunnions 12 which have enlarged base portions. The portion 4 of the member 5 is provided with a transverse passage 13 through which a pin 14 extends. The pin 14 fits tightly in the passage 13 and protrudes at its respectively opposite ends beyond the side edges of the portion 4 so as to provide spaced trunnions 15 at the respectively opposite sides of the member 5. The trunnions 12 and 15 are located substantially 90 degrees apart and their center axes preferably intersect.

These trunnions are connected together by torque rings which include complementary sections 16 and 17, each having four registering semi-cylindrical depressions or sockets 18 and 19 respectively. The sections 16 and 17 of the torque ring are rigidly fixed together by bolts 20 which extend through registering apertures in those portions of the ring sections that are located between the depressions 18 and 19. The complementary registering recesses 18 and 19 form four complete cylindrical sockets which are each located substantially 90 degrees apart.

Mounted on the trunnions of the universal joint are bearings which are substantially identical in construction. Each bearing includes a cup-shaped casing 21 having a cylindrical side portion 22 which fits into the socket formed by the complementary depressions 18 and 19 of the torque ring sections. The open end portion of the casing 21 has an outwardly offset skirt 23 and an adjacent radial shoulder 24 upon which the socket is seated. The casing 21 is concentrically mounted on the trunnion 12 with its cylindrical side wall 22 in spaced relation to the periphery of the trunnion and a disc 25, preferably comprising bearing metal, located between the inner side of the end wall 26 of the casing and the end extremity of the trunnion. The joint as a whole is centered by the ends of the trunnions abutting against their respective discs 25.

A bushing 27, comprising bearing material is journaled on the trunnion 12 and is held against rotation relative to the casing by a concentric sleeve 28 which tightly fits between the outer periphery of the bushing and the inner periphery of the casing 21. Formed in the outer periphery of the sleeve 28 are substantially semi-cylindrical grooves or lubricant containing chambers 29 which extend axially of the sleeve from one end to the other end thereof. The grooves 29 register at their inner extremities with radial grooves 30 which communicate with the interior of the casing 21 at its inner extremity. The open sides of the axial grooves 29 are sealed by the inner periphery of the casing 21.

The extremities of the outwardly offset skirt 23 of the bearing casings on the trunnions of the members 1 and 2, respectively, register with substantially planular surfaces on the driving and driven members, in which are formed circular channel-ways or grooves 31 that are concentric with the trunnions.

Mounted in the enlarged open end of the casing 21 which is surrounded by the offset skirt 23 is a sheet metal sleeve 32 which has a flange 33 that extends inwardly to within close proximity of a periphery 34 of reduced diameter on the sleeve 28 which is located at the outer ends of the groove 29. The outer end portion of the sleeve 32 extends into the groove 31 forming a baffle around which dirt is required to flow, in opposition to the centrifugal forces created during rotation of the universal joint, in order to enter the bearing. Located between the sleeve 32 and the base portion of the trunnion 12 is a packing ring 35, preferably comprising cork or other suitable yieldable material, which aids in sealing the open end of the bearing against the admission of dirt and the leakage of lubricant.

In assembling a universal joint of this kind the lubricant containing groove 29 of the sleeve 28 is filled with grease or other suitable lubricant which may be packed into the groove before the sleeve is inserted into the casing, or introduced thereinto after the bearing is assembled through the open outer ends of the groove in any suitable manner. During rotation of the universal joint the lubricant which is thrown outwardly by centrifugal force enters the radial passages 30 in the inner end of the sleeve 28 and flows into the interior of the casing substantially at the inner extremity of the bushing 27. The free end of the trunnion is chamfered, as illustrated at 36 in Fig. 1, so as to provide an annular groove around the inner edge of the contacting surfaces of the trunnion and bushing for receiving the lubricant which flows from this groove between the contacting surfaces of the trunnion and bushing.

In Fig. 5 of the drawing is illustrated a bearing which includes a casing 21' that is substantially identical in construction to the casing 21 shown in Fig. 1, and which is journaled on a trunnion 12' of a yoke arm 2' of the torque transmitting member of a universal joint. The casing 21' has a cylindrical portion 22' which is located within a cylindrical socket formed by complementary recessed portions 18' and 19' of a torque ring. The outer end of the casing is closed by an end wall 26' and the inner open end of the casing is bounded by an outwardly offset wall or skirt portion 23'. Journaled on the trunnion 12' is a bushing 27', preferably comprising bearing metal which is rigidly held against rotation relative to the casing 21 by a sleeve 37 that fits tightly between the outer periphery of the bushing and the inner periphery of the casing. Formed in the outer periphery of the sleeve 37 is a helical groove 38 which communicates with the interior of the casing at the free end of the trunnion 12'.

A sheet metal sleeve 32' mounted in the enlarged open end of the casing 21' has an inwardly extending flange 33' which terminates in close proximity to the outer periphery of the sleeve 37. The outer edge portions of the sleeve 32' extend beyond the end of the casing into a groove 31' which is formed concentric with respect to the trunnion 12' in the side of the yoke arm 2'. Located between the sleeve 32' and the base portion of the trunnion is a packing ring 35' which is preferably formed of cork or other suitable yieldable material.

During operation of the universal joint lubricant, which is stored in the helical groove 38, works outwardly toward the outlet of the groove and passes into the interior of the casing around the inner edge portions of the contacting surfaces of the trunnion and bushing. The lubricant passes between and lubricates these surfaces, the action being aided by centrifugal force and capillary attraction.

In the form of the invention shown in Fig. 6, the bearing includes a casing 39 having a cylindrical side portion 40 on which is provided an outwardly offset wall or skirt 41. The casing 39 is seated upon a trunnion 42 and it has a bearing plate 43 on the inner side of its end wall 44 which abuts against the free extremity of the trunnion. Journaled on the trunnion 22 is a bushing 45 which is held against relative rotation to the casing by a sleeve 46 that tightly fits between the inner and outer peripheries of the casing 39 and the bushing 45.

Circumferential grooves 47 are formed in the outer periphery of the sleeve 46 for retaining a supply of lubricant. These grooves are connected by an axial groove 48 which extends through the ridges that separate the adjacent circumferential grooves and which communicates with a radial slot 49 in the inner extremity of the sleeve. The radial slot 49 communicates with the interior of the casing at the free end of the trunnion 42 and supplies lubricant from the circumferential grooves 47 to the contacting surfaces of the trunnion and bushing.

Although several specific embodiments of this invention have been herein shown and described, it will be understood that numerous details of the constructions shown may be altered or omitted without departing from the spirit of this invention as defined by the following claims.

I claim:

1. In a universal joint, a rotatable member including a trunnion, and a bearing journaled on said trunnion including an outer casing, an inner bushing and an intermediate sleeve having lubricant containing grooves in its outer periphery communicating with the interior of said casing.

2. In a unversal joint, a rotatable member including a trunnion, a bearing having a bushing journaled on said trunnion and including an outer tubular member, and a sleeve between said bushing and said tubular member having lubricant containing grooves in its outer periphery communicating with the interior of said tubular member at the free extremity of said trunnion for feeding lubricant to the contacting surfaces of said trunnion and bushing, respectively.

3. In a universal joint, a rotatable member including a trunnion, a bearing having a bushing journaled on said trunnion and including an outer tubular member, and a sleeve between said bushing and said tubular member having axial lubricant containing grooves in its outer periphery and having registering radial grooves in one extremity communicating with the interior of said tubular member at the free end of said trunnion.

4. In a universal joint, a rotatable member including a trunnion, a bearing having a bushing journaled on said trunnion and including an outer tubular member, and a sleeve between said bushing and said tubular member having a helical lubricant containing groove in its outer periphery communicating with the interior of said tubular member at the free extremity of said trunnion.

5. In a universal joint, a rotatable member including a trunnion, a bearing having a bushing journaled on said trunnion and including an outer tubular member, and a sleeve between said bushing and said tubular member having circumferential grooves in its outer periphery communicating with the interior of said tubular member at the free extremity of said trunnion.

6. In a universal joint, a rotatable member having a trunnion, a cup-shaped casing mounted on said trunnion having side walls spaced from the periphery thereof, and a sleeve in said casing having lubricant containing grooves in its outer periphery communicating with the interior of said casing, said sleeve having a press fit with the inner periphery of said casing for securing the sleeve against rotation and for sealing the open sides of said grooves.

7. In a universal joint, a rotatable member having a trunnion, a cup-shaped casing mounted on said trunnion having side walls spaced from the periphery thereof, and a sleeve in said casing having axial lubricant containing grooves in its outer periphery and registering radial grooves in its inner extremity communicating with the interior of said casing, the open sides of said axial grooves being sealed by the inner periphery of said casing.

ARCHIBALD A. WARNER.